United States Patent
Maynard

[15] 3,683,252
[45] Aug. 8, 1972

[54] DYNAMOELECTRIC MACHINE CONTROL CIRCUIT HAVING CURRENT LIMITING MEANS

[72] Inventor: John T. Maynard, New Berlin, Wis.
[73] Assignee: A. O. Smith Corporation, Milwaukee, Wis.
[22] Filed: May 20, 1970
[21] Appl. No.: 39,016

[52] U.S. Cl..............................318/331, 318/345
[51] Int. Cl...........................................H02p 5/16
[58] Field of Search...........318/327, 331, 332, 345

[56] References Cited

UNITED STATES PATENTS

| | | |
|---|---|---|
| 3,284,688 | 11/1966 | Black........................318/332 |
| 3,497,786 | 2/1970 | Lombardo...............318/331 |
| 3,181,050 | 4/1965 | Berman....................318/331 |
| 2,847,632 | 8/1958 | Harvey.....................318/327 |
| 3,252,069 | 5/1966 | Ringrose..................318/331 |
| 3,494,340 | 1/1950 | Leigh........................318/345 |
| 2,845,589 | 7/1958 | Osgood.....................318/345 |
| 2,929,979 | 3/1960 | Fischer.....................318/345 |

Primary Examiner—Bernard A. Gilheany
Assistant Examiner—Thomas Langer
Attorney—Andrus, Sceales, Starke & Sawall

[57] ABSTRACT

A D.C. shunt motor armature is connected to a three-phase A.C. input through a pair of parallel-connected, full-wave, silicon controlled bridge rectifiers to selectively vary the voltage and current supply to the armature. The controlled rectifiers are phase controlled in accordance with a command voltage, an armature voltage and a modifying voltage proportional to the counterelectromotive force for IR compensation and armature current for current limit. The modifying voltage includes an armature current related signal establishing a percentage armature current compensation which is of the order of 50 percent and greatly in excess of the normal IR compensation and directly establishes a continuous current limit to positively prevent excessive armature current by phasing back of the bridge rectifiers.

13 Claims, 4 Drawing Figures

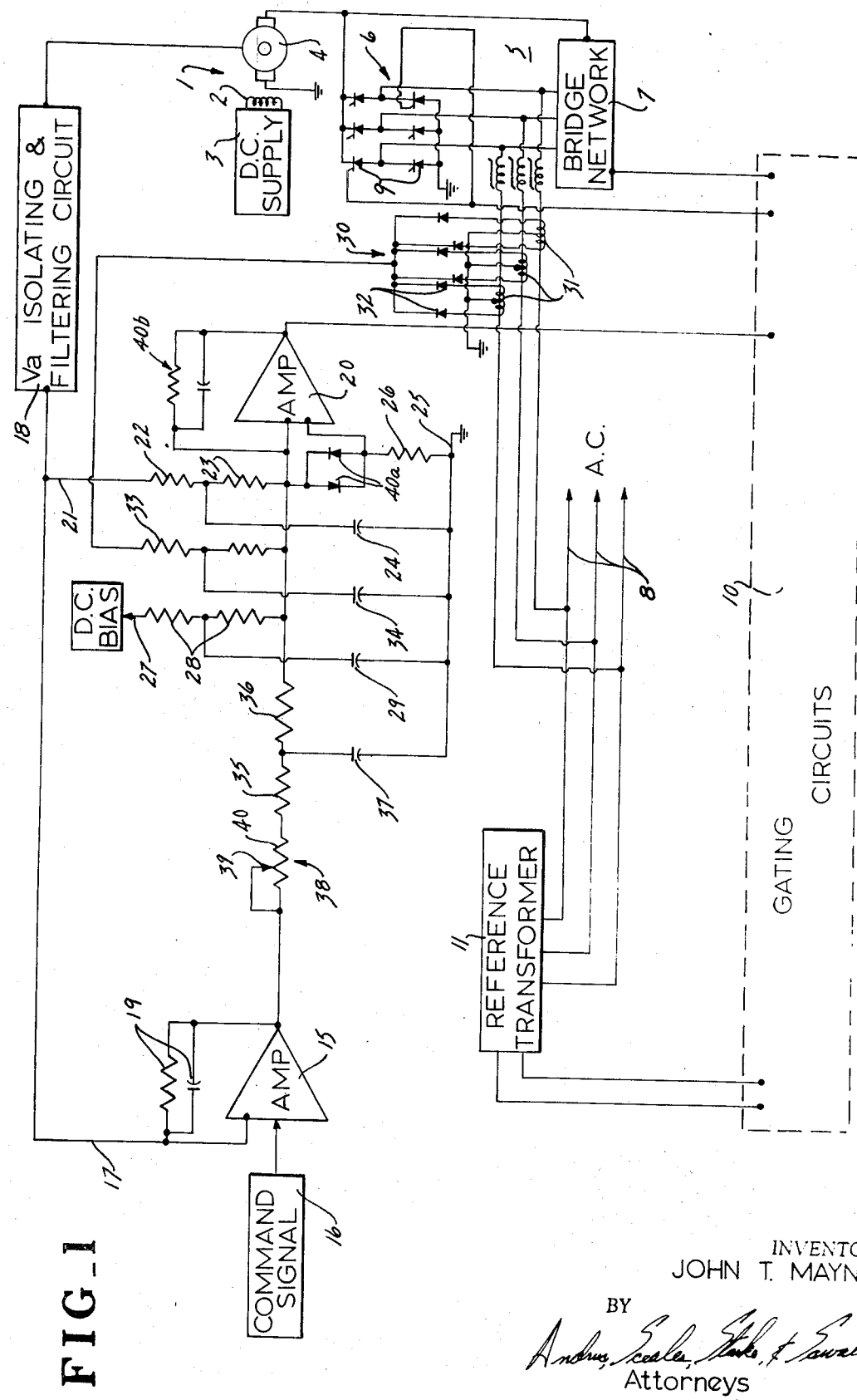
FIG_1

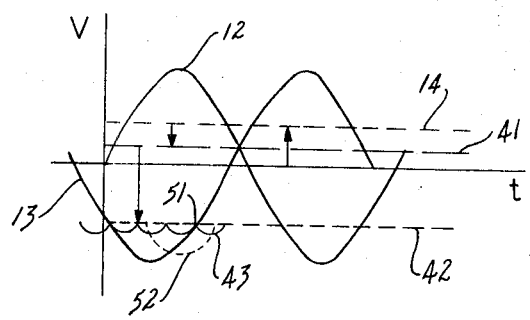
FIG_2
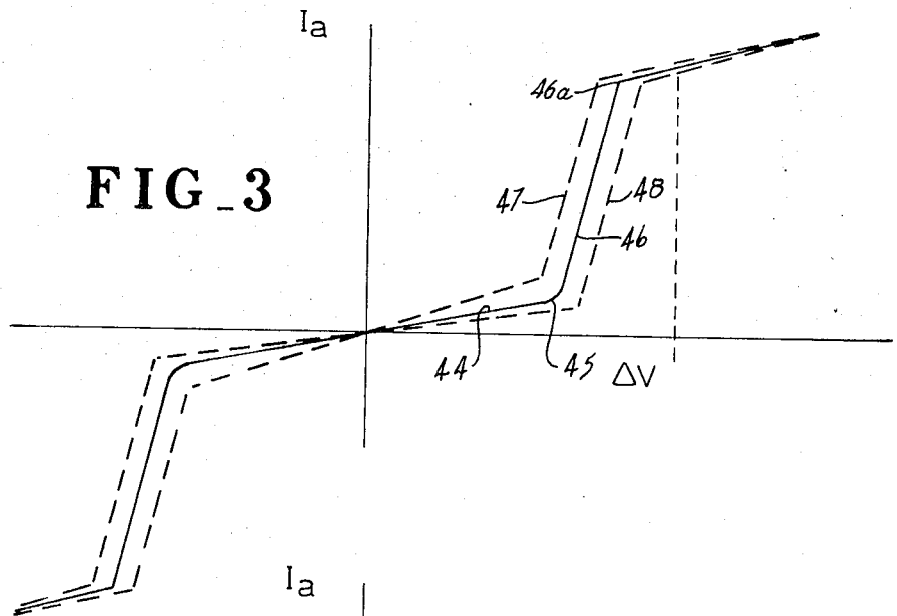
FIG_3
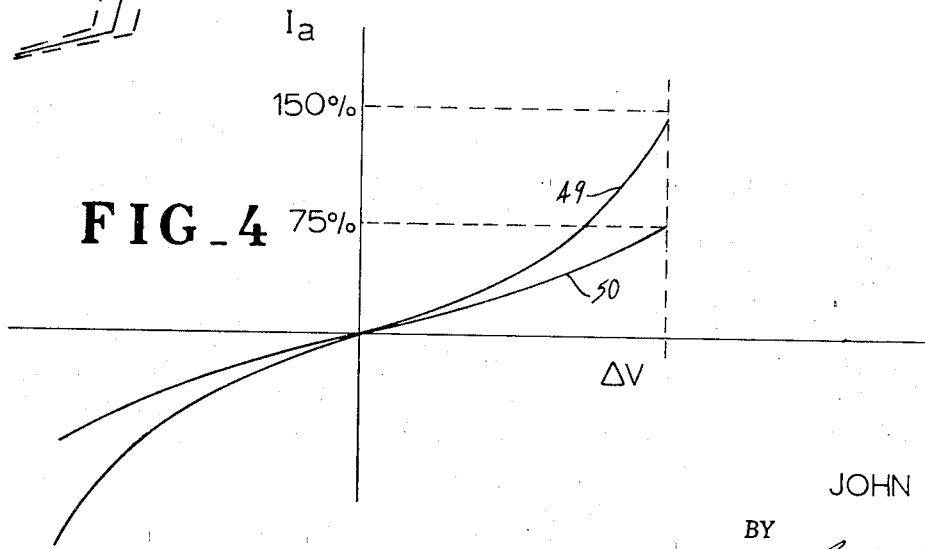
FIG_4

DYNAMOELECTRIC MACHINE CONTROL CIRCUIT HAVING CURRENT LIMITING MEANS

BACKGROUND OF THE INVENTION

Direct current motor drives and the like advantageously employ a feedback system to control the input power to the motor and thereby the motor speed output or the like. A direct current shunt motor provides a highly desirable drive where a relatively constant speed combined with a high starting torque is required. Such a motor may have a fixed field excitation with a variable armature current control for establishing the desired speed and torque characteristic. A highly satisfactory system for controlling a direct current shunt motor or the like is shown in applicant's copending application Ser. No. 713,247, filed Mar. 14, 1968 and titled Dynamoelectric Control Circuit, wherein an analog control system compares a D.C. command signal with a plurality of correspondingly related feedback signals. The analog feedback system or the control system employs phase control of a plurality of controlled rectifiers connecting the armature to a three-phase power supply. Firing is controlled by the intercept between an alternating control signal related to the voltage applied to the control rectifier and a direct current analog intercept firing signal. In particular, the system sums a command voltage with a feedback armature voltage to establish an error signal. This amplified error signal is further modified by a voltage proportional to the counterelectromotive force (CEMF or counter EMF) of the motor armature to provide for automatic tracking of the zero crossing point. The summation or modification of the error signal by the CEMF signal provides an effective zero gating for zero armature current while continuously adjusting the reference level from which the error signal operates to control the firing in accordance with the actual error signals and the CEMF voltage.

In such systems, it is important, however, that the armature current be limited. A convenient circuit to provide current limit is a voltage-sensitive diode, such as a Zener diode connected in the current feedback network. At an excessive current, the diode abruptly breaks over and conducts, thereby increasing the current feedback to, in essence, swamp the control signal and phase back the firing. Although this system is highly desirable for any given motor, applicant found the armature current versus error signal characteristic varied from motor to motor and in some instances a condition of possible instability was created. The prior circuit also employed an input or supply line isolation transformer which tended to stabilize the current response characteristic. However, variations of transformer and source impedance also contributed to the variation in the particular error signal characteristic. However, with the transformer impedance removed, Zener diode type protection was absolutely essential to prevent excessive current. Generally, the current versus error signal characteristic with a Zener diode has three distinct portions, including an initial small slope portion corresponding to a discontinuous armature current region, followed by a very steep slope portion corresponding to a continuous armature current region covering the regulating voltage range and a final Zener voltage breakover or current limit range. In this latter range, the effective armature current limit value is dependent upon the magnitude of error voltage when Zener breakover occurs and the current limit deviation from set point (15 percent rated current typical) may be as great as 75 percent over the error voltage range. Thus, the shape of the curve was essentially an S-shaped curve with very sharp areas of transition. The steep regulating portion, however, constituted a very small percentage, typically 15 percent of the total error voltage response and thus, any variation in the characteristic resulted in a condition which would tend to create instability, particularly in the transition regions.

SUMMARY OF THE PRESENT INVENTION

The present invention particularly relates to a dynamoelectric control circuit for controlling the armature current or the like and particularly to such a circuit employing a continuous and improved current limit control.

Generally, in accordance with the present invention, an error signal indicative of the difference between the desired motor operation and the actual motor operation and an armature current feedback signal is established as a part of a summated control signal with the relative percentage of the error signal and the current-related feedback signal interrelated to establish what would normally be considered excessive current related feedback compensation. Applicant's analysis of the circuit problem indicated that by establishing a relatively excessive compensating feedback, the armature current versus error signal characteristic of the motor control could be corrected to establish and maintain stable and improved operation with very accurate and reliable current limit control. Thus, the transfer function or characteristic of the control system is such that the response is essentially the same, notwithstanding the slight variations inherent in the required component tolerances for commercial production of various motors and the related controls. Further applicant has found that the current feedback signal is applied directly as an essentially unfiltered current signal and in phase with the main current. This provides the desired D.C. signal with a superimposed ripple which is, in essence, in phase with the main armature current. Applicant has found that the unfiltered, in-phase current automatically retards and advances the firing point to maintain very reliable modulation of the firing point.

In accordance with a further teaching of the present invention, current limit control can be established by changing of the relative level of the current feedback current and the error signal. As the two signals operate in opposition, the armature compensating current signal can be increased or the error signal can be reduced or starved. The firing or gating signal is thus made up of a plurality of current-related voltages: a current signal which retards the firing point and an error signal which advances the firing point.

The present invention appears to establish or derive the substantial and increased stability from a shaping of the transfer function and in particular the elimination of all sharp transitions in the characteristic while providing a well defined cutoff within the desirable current limit ranges. The present invention thus provides a highly improved current modulation and stability in the motor response characteristic while maintaining reliable armature current limit inherently independent of motor and source impedance parameters.

BRIEF DESCRIPTION OF THE DRAWINGS

The drawings furnished herewith illustrate a preferred construction of the present invention in which the above advantages and features are clearly disclosed, as well as others which will be clear from the following description.

In the drawings:

FIG. 1 is a diagrammatic view of a motor control circuit constructed in accordance with the present invention;

FIG. 2 is a diagrammatic graphical illustration of the control voltages in the circuit of FIG. 1;

FIG. 3 is a diagrammatic graphical illustration showing the armature current versus error signal characteristics of a Zener diode current limit control circuit; and FIG. 4 is a similar diagrammatic illustration of the characteristic curve resulting from the present invention.

Referring to the drawings, and particularly to FIG. 1, the present invention is illustrated as applied to control the operation of a direct current shunt motor 1 of any well-known construction and generally in accordance with the teaching of applicant's previously identified copending application. The illustrated shunt motor 1 is diagrammatically shown including a field 2 connected to a fixed D.C. excitation source 3. The motor 1 includes the usual armature 4 which is rotatably mounted within the field 2. Armature 4 is connected to a direct current power supply circuit 5 including a pair of gated rectifier bridge networks 6 and 7 for selectively providing a forward and reverse current to the armature. The input sides of the bridge networks 6 are connected in parallel to a suitable three-phase power source and may, in accordance with the teaching of the present invention, be connected directly to the widely employed industrial 460-volt alternating current supply lines 8, without the necessity of a line coupling transformer. The bridge networks 6 and 7 are well-known, three-phase, full-wave bridge networks which, in accordance with the present invention, use an individual silicon-controlled rectifier 9 in each leg of the bridge. The controlled rectifiers 9 are interconnected to a digital gating regulator 10 to selectively control the firing and conductivity of the rectifiers. The rectifier networks 6 and 7 are reversely connected such that the one rectifier network 6 establishes a given directional flow with a corresponding torque, and the opposite bridge network 6 provides an opposite directional torque. Either bridge network will provide motoring or regeneration, depending upon the load and the firing of rectifiers 9. The digital gating regulator 10 functions in response to the intercept of a D.C. signal with an alternating current reference signal, in accordance with the teaching of applicant's copending application. The alternating current reference signal is derived from a reference transformer 11 connected to the three-phase power transformer 8. The reference signal is modified with respect to actual rectifier anode voltage trace and is generally of an opposite phase for the particular logic transistors employed. Thus, the circuit preferably employs an NPN-transistor circuit with a positive logic. Referring particularly to FIG. 2, the controlled rectifier anode voltage is shown by trace 12. The firing reference voltage 13 is inverted, and is phase-shifted 30 degrees leading to establish a maximum trigger in synchronism with the 60° angle of the anode voltage trace 12. An initial D.C. level bias signal, shown by the level line 14, is superimposed on the reference signal and in effect, shifts the reference signal with reference to the anode voltage such that the reference signal intercepts the D.C. bias level signal in synchronism with the zero crossover point of the actual anode voltage trace 12.

As noted above, the reference signal is phase-shifted 30° such that the maximum level signal of the reference signal coincides with the 60° angle of the actual anode voltage. This establishes the maximum advance firing point which, in a three-phase system, corresponds to the firing point for maximum possible output. Further, it permits 180° control extending from the 60° firing for motoring through 60° during the negative half-cycle for purposes of regenerating.

The D.C. bias signal level 14 is modified in accordance with feedback voltage signals, as presently described, to advance or retard the firing points in accordance with motoring and regenerating operation.

Referring again to FIG. 1, the illustrated control circuit includes a high-gain error amplifier 15 having a first D.C. input connected to a command signal source 16 and a second input signal terminal which is connected to an armature voltage feedback line 17. The present invention employs a suitable scaled control voltage. Thus, the control command signal may vary, for example, between zero and 10 volts which will be related to a variation in the armature voltage of zero and 500 volts. The voltage feedback line 17 is interconnected to a voltage isolating and filtering circuit 18 connected directly to the motor armature 4. Circuit 18 provides an isolated, essentially constant direct current (d.c.) signal proportional to the actual armature voltage, but scaled to the command voltage. The error amplifier 15 is selected to have a substantial gain and the output is proportional to the amplified difference in the command voltage signal and the feedback voltage signal multiplied by such error amplifier gain. A resistor-capacitor feedback network 19 may be employed to stabilize the amplifier 15 in accordance with known design. The output of the error signal is applied to a similar summing amplifier 20 where it is modified by a counterelectromotive force-related signal and with an automatic current limit such that the D.C. bias level firing signal is a summation of the error signal and the several compensation signals. Generally, firing voltage level $V_f$ can be written in equation form as:

$$-\beta \Delta V - V_a + I_a R_a + V_{Ia} + V_b = V_f$$

wherein the $-\beta \Delta V$ is the error signal, $V_a$ is the scaled armature voltage, $V_{Ia}$ is the scaled armature current, hereinafter referred to as the current feedback $I_a$, $R_a$ is the scaled armature resistance, and $V_b$ is the D.C. bias level. The delta $V$ and the armature voltage $V_a$ have a negative sign indicating that they tend to advance the firing angle and thereby increase the armature voltage and correspondingly the armature current. The plus sign associated with the other compensating factors and, in particular, the armature current and the D.C. bias indicate that they tend to retard the firing angle and thereby reduce the current supply to the armature. As hereinafter developed, the present invention employs adjustment of the error signal, delta $V$ and/or the current feedback $I_a$, in combination with a substantial current feedback to provide continuous current limit with improved stability of response.

More particularly referring to the circuit of FIG. 1, the armature voltage signal is derived through the interconnection of an armature voltage line 21 to the voltage isolating and filtering network 18. Line 21 is connected to the input of the summing amplifier 20 through a pair of series-connected resistors 22 and 23, the center junction of which is connected via a noise filtering capacitor 24 to logic common line 25. A resistor 26 connects the common line 25 to the opposite side of the amplifier 20. This provides an essentially constant D.C. signal proportional to the actual armature voltage to the summing amplifier 20.

The D.C. bias voltage is supplied to the input of the summing amplifier from a voltage source line 27 through a pair of series-connected resistors 28, the common junction of which is interconnected to the logic common line 25 by a capacitor 29. The D.C. bias voltage level provides a constant input signal to the amplifier 20 establishing the desired D.C. output signal in the absence of all other input signals.

In accordance with the present invention, the armature current signal is interconnected into the summing amplifier 20. The current sensing network 30 may, for example, include current transformers 31 and a three-phase, full-wave rectifier 32, establishing a properly scaled current signal. Of particular significance is the direct connection of the output of rectifier 32 without any significant filtering to amplifier 20. A pair of series-connected resistors 33 interconnect the current line 28 directly to the input of the amplifier 20. A very small capacitor 34 interconnects the junction of the resistors 33 to the logic common line 25. Capacitor 34 will provide transient protection, but will not produce any significant filtering. This inserts an armature current signal which is essentially a D.C. voltage signal, including the ripple component of the armature current as applied to the armature.

In addition to the above, the output of the error amplifier 15 is connected to the summing amplifier 20. The interconnecting error amplifying network includes a pair of series-connected resistors 35 and 36 connected between the output of the error amplifier 15 and the input of the summing amplifier 20. A transient filtering capacitor 37 interconnects the junction of the resistors 35 and 36 to logic common 25. In accordance with the present invention, the error amplifier connecting network includes a current limit setting potentiometer 38 interconnected in series between amplifier 15 and the coupling resistors. The current limit potentiometer 38 includes the movable tap 39 for selectively bypassing portions of the current limit resistor 40 of potentiometer 38. This, therefore, adjusts the current supplied to the summing amplifier 20 with changes in the error signal delta $V$ and as presently described, shifts the transfer function and characteristic of the closed-loop system. The illustrated summing amplifier 20 has a pair of parallel-connected, oppositely polarized clamping diodes 40a connected across the input terminals and an R-C stabilizing feedback network 40b connected between the input and the output to produce the desired response to rapidly changing signals.

Referring to FIG. 2, the delta $V$ signal is thus summated with the D.C. bias level line 14 to establish a new intercept line 41. Further superimposed on this line 41 is the effect of the voltage feedback via resistors 22 and 23 and the armature current feedback via the resistors 33. The voltage signal is a suitable filtered, direct current level which functions in the same direction as the error signal to establish a selected constant D.C. level line 42. This level is further changed by the current feedback signal, which in accordance with the present invention, is an unfiltered direct current signal shown as trace 43 added to and modulating the intercept line 42. The current feedback signal trace 43 includes both the $I_a$ and $I_a R_a$ component of the previous equation. The $I_a R_a$ component relates to the voltage by which the armature voltage $V_a$ is reduced to establish a signal proportional to the counterelectromotive armature voltage. This is generally of the order of 10 to 11 percent maximum of the rated voltage as scaled to the voltage level of the control system. However, the present invention employs a current feedback signal which can be similarly related as feedback voltage in terms of the rated voltage in excess of this and preferably of at least the order of 30 or 60 percent, of the rated voltage which is indicated in the equation by the voltage signal related to factor $I_a$. Applicant has discovered that the substantial and excess feedback stabilizes the operation of the circuit and permits operation without the usual line source coupling transformer employed heretofore in order to introduce a stabilizing impedance factor.

Referring particularly to FIG. 3, a characteristic curve indicating the transfer function of the system and particularly relating the change in armature current signal $I_a$ with a change in error signal $\Delta V$ is illustrated for the control circuits heretofore constructed employing a Zener diode current limit. In this device, the armature current was interconnected through a suitable coupling transformer and well filtered to establish a constant D.C. proportional to the average armature current. The current control range existed approximately over zero to 10 volts, with an initial relatively low-slope portion 44 covering from zero to 6 volts. At that point, a relatively sharp break in the curve was established for a relatively slight change in voltage as at 45 with a second high slope portion 46 which was essentially linear, thus defining a discontinuous characteristic. Generally, the voltage control of the second portion 46 covered about 2 volts before the maximum permissible current level was reached.

Thus the characteristic of FIG. 3 shows the overall motor armature and error signal voltage characteristic. The portion 44 of the curve is generally related to a discontinuous current characteristic wherein the current supplied to the armature for each input cycle of the power supply is a series of time spaced pulses with a significant zero current between pulses. The illustrated current of FIG. 3 is the average current supplied by such time spaced pulses. This area is generally known as a discontinuous current area. As the current supply is increased the pulses increase in amplitude and width until such point as the termination of one pulse at the zero axis is associated with essentially the immediate initiation of a subsequent pulse. At this particular transition point the characteristic changes, generally as shown by the curved portion 45, which defines a transition area to the continuous current characteristic of portion 46. In the latter, the current pulses significantly overlap and another pulse starts before any given pulse engages the zero axis. In this area the current changes relatively rapidly with the error voltage signal (V) and thus according to the slope of line 46 which once again is the average of the overlapping pulses. Thus as the error voltage signal changes, the current rapidly increases. In accordance with the characteristic of FIG. 3, the current rises to a point 46a which is approximately the desired maximum armature current for the particular circuit. At approximately permissible current level, the circuit was constructed such that the Zener diode broke over to conduct as the point 46a and establish a direct and essentially 100 percent current feedback. This high current feedback, represented by the separate $I_a$ in the equation and particularly the voltage related signal in the voltage equation, significantly reduced the slope and resulted in a current limit which was dependent upon the error voltage magnitude. As previously noted, although this circuit provides a satisfactorily operating system, the particular characteristic curve would change slightly with the error voltage, the particular motor and the particular source transformer, for example, as shown by the dashed lined curves 47 and 48. Further, when the source transformer was removed, the transfer function slope 46 increased to further restrict the control range. Stable operation is difficult to achieve under these conditions.

In accordance with the present invention, the armature current signal is fed back without any essential filtering and without the interposition of an iron core source transformer. Nevertheless, the circuit operates satisfactorily with an automatic current limit. It appears that the transfer function or characteristic of FIG. 3 is modified to that shown generally in FIG. 4, where the changes of current $I_a$ with the error signal $\Delta V$ is a continuously changing function and, in particular, without any sharp transition points or areas such as defined by the discontinuous characteristic or transfer function of FIG. 3 and with interception of the maximum feedback error signal within the desired current limit. Two curves 49 and 50 of a continuous transfer function are shown for typical minimum and maximum current limit settings. Thus, by adjusting of the tap 39 of the potentiometer 38, the control circuit can be made to respond and establish a maximum armature current of anywhere between 75 and 150 percent of rated armature current. The same adjustment could, of course, be inserted in line 28, with the setting being in an opposite direction in view of the opposite signs of the factor in the equation.

As noted previously, the current feedback is substantially greater than that required for armature voltage drop IR compensation. Thus, normally, armature voltage compensation can require and vary up to 8 percent of rated voltage and in order to ensure stability, 10 to 11 percent of rated voltage was normally employed. In accordance with the present invention, however, applicant has found that the feedback should be increased to the order of 50 percent and that it will operate satisfactorily with any feedback up to the order of 80 percent. This degree of feedback increase modifies the overall characteristic to significantly change the slope and in fact tends to straighten and lengthen the transfer function as shown in FIG. 3 to that shown in FIG. 4. It would appear that the feedback controls the linearity and the gain characteristic of the control system to thereby modify its transfer function to the relatively smooth and continuously changing characteristic with the highly desirable continuous control without the necessity for other stability devices and the like. Generally, increasing of the feedback to 15 percent and above, tends to extend or flatten the curvature of the response characteristic as shown in FIG. 4 with a reduction in the maximum percentage current rating which can be employed.

Furthermore, the use of the unfiltered current feedback provides an inherent and automatic regulation or modulation of the firing. Thus, as shown in FIG. 2, the current feedback signal is not a pure D.C. signal, but is a full-wave unfiltered signal 43 defining a plurality of hills and valleys, with the bottom points 51 of the valleys generally establishing and corresponding to the firing points. If, for any reason, a given phase is excessive, for example, as a result of an unbalanced supply line, the corresponding phase current signal will be correspondingly enlarged as at 52. This will automatically shift the valley point and tend to retard the firing of the next stage of the rectifier 9, thereby reducing the current supplied to the armature and providing the desired modulation.

Thus, motor specification generally limits the maximum armature current modulation or overshoot to a given percentage for a normal supply line variation. Generally, the specification may be a 10 percent variation for the normal maximum line voltage change. The present invention permits a substantially smaller percent modulation, such as in the order of 3 to 5 percent and, by accurate current feedback, essentially an absolute limit on the maximum armature current, such as a 5 percent maximum deviation.

The adjustment of the particular characteristic can, within limits, be made either by adjusting the current limit feedback circuit or the error signal feedback circuit through the use of a variable impedance element. In the illustrated embodiment of the invention, applicant has shown the potentiometer 38 in the error signal feedback line which has been used satisfactorily to vary and adjust the maximum and minimum limits of current within the rated current range.

The present invention thus provides an improved motor control system employing an armature current transfer characteristic without any sharp demarcation as a result of employing a greater amount of current feedback than that ordinarily dictated by armature impedance drop. This establishes a highly improved motor control circuit.

Various modes of carrying out the invention are contemplated as being within the scope of the following claims which particularly point out and distinctly claim the subject matter which is regarded as the invention.

I claim:

1. A motor control circuit for operating a motor having an armature at a selected rated voltage comprising, first means to establish an error signal proportional to the difference between a desired motor operation at a selected rated voltage and the actual motor operation, second means to establish a compensating signal proportional to the counterelectromotive force of the armature of the motor, said last named means including negative current feedback means establishing a compensating voltage signal directly proportional to the armature current and forming a single combination circuit impedance compensating signal and an armature current limit signal, said compensating voltage signal being correspondingly scaled to the error signal and being equal to at least 30 percent of the corresponding scaled rated voltage to establish and maintain a continuous and smoothly changing transfer function including said compensating voltage signal, and motor control means responsive to said error signal and to said compensating signal.

2. The motor control circuit of claim 1, having supply lines connected to said motor and said current feedback means establishes said transfer function which is essentially independent of the resistance of the motor armature, the impedance of the supply lines and motor speed.

3. The motor control circuit of claim 1, including three-phase power distribution lines, and rectifying means connecting said armature essentially directly to said power distribution lines and having a gated means to selectively supply power line voltage to said armature, said control means being connected to selectively gate said gated means.

4. The motor control circuit of claim 1, wherein said first means establishes an essentially constant direct current level at any given motor operation deviation, said second means includes a full wave rectifying means establishing a direct current armature current related signal having a full wave ripple component and includes means to impress said related signal on said direct current error signal to establish a control signal, and said motor control means including means to establish an alternating current reference signal and establishing an operating signal in synchronism with a selected intercept of the control signal with said reference signal.

5. A motor control circuit for operating a motor at a selected rated voltage from a transformer supply means comprising, command signal means to establish a command signal proportional to a desired motor operation at a selected rated voltage, first feedback means to establish a feedback signal proportional to actual motor armature voltage, first summating means connected to said command signal means and to said feedback means to provide an error signal proportional to the algebraic sum of said command signal and said feedback signal, second feedback means to establish a second feedback signal proportional to the armature voltage and a third negative feedback signal proportional to the armature current, a second summating means connected to said first summating means and to said second feedback means to provide a summated control signal proportional to the algebraic sum of said error signal and said voltage and current feedback signals, said second and third feedback signals being of opposite polarity to establish a compensating signal related to the armature voltage drop, control means connected to said second summating means to control the current supplied to the armature, said third feedback signal establishing a continuous compensating armature current signal in excess of 25 percent of rated voltage and establishing a limit on the armature current supplied to the armature with the transfer function essentially independent of the impedance of the motor armature and the transformer supply means.

6. The motor control circuit of claim 5, having means to inversely vary the relative magnitude of the error signal and the third feedback signal for a given change in armature voltage and thereby vary the limit of the armature current.

7. The motor control circuit of claim 5, having an adjustable resistance means connecting the first summating means to the second summating means to vary the magnitude of the error signal for a given change in armature voltage and thereby vary the limit of the armature current.

8. The motor control circuit of claim 5, having a series connected adjustable potentiometer connecting the first summating means to the second summating means to vary the limit of the armature current.

9. The motor control circuit of claim 5, having gated means including an alternating current input and a periodic output, and gating means connecting the gated means to said second summating means and establishing a gating signal in response to the intercept of an alternating current reference voltage signal with the summated control signal from said second summating means.

10. The motor control circuit of claim 5, wherein said control means includes a gated rectifying means, including phase controlled rectifiers having an alternating current input and a direct current output and a firing means responsive to the intercept of said summated control signal and a reference voltage signal in a selected phase relationship with the voltage impressed upon said phase controlled rectifiers.

11. The motor control circuit of claim 5, wherein said control means including a three-phase full-wave rectifying means having an alternating current input and individual gated rectifiers for sequentially transmitting the sequential power phases as a direct current, said control means including an alternating current firing means in preselected phase relationship to said alternating current input, said first feedback means establishing a direct current feedback signal, said first summating means including an amplifier to provide a direct current error signal, said second feedback signal being a direct current proportional to the armature voltage and the third feedback signal being an unfiltered direct current signal proportional to current from a full wave rectifying means, said second summating means including an amplifier establishing said summated control signal, and means to impress said control signal on said firing means to control the firing of the gated rectifiers.

12. The motor control circuit of claim 11 wherein said armature current signal is of the order of 50 percent of rated voltage.

13. The motor control circuit of claim 11 wherein said armature current signal is in the range of 25 percent to 80 percent of rated voltage.

* * * * *